Aug. 26, 1941.  W. T. DAVIS  2,253,611
APPARATUS FOR MOLDING OF PLASTIC ARTICLES
Filed May 12, 1937  2 Sheets-Sheet 1

INVENTOR
Walter T. Davis

Aug. 26, 1941.    W. T. DAVIS    2,253,611
APPARATUS FOR MOLDING OF PLASTIC ARTICLES
Filed May 12, 1937    2 Sheets-Sheet 2
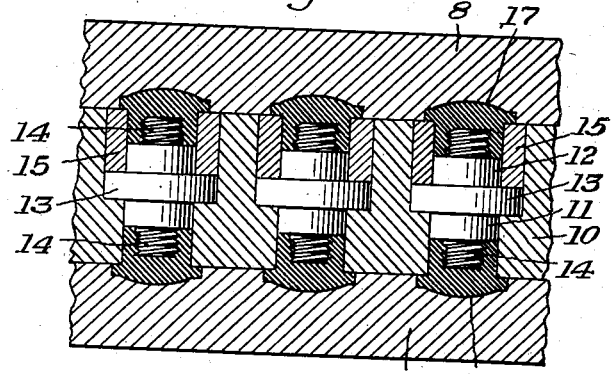
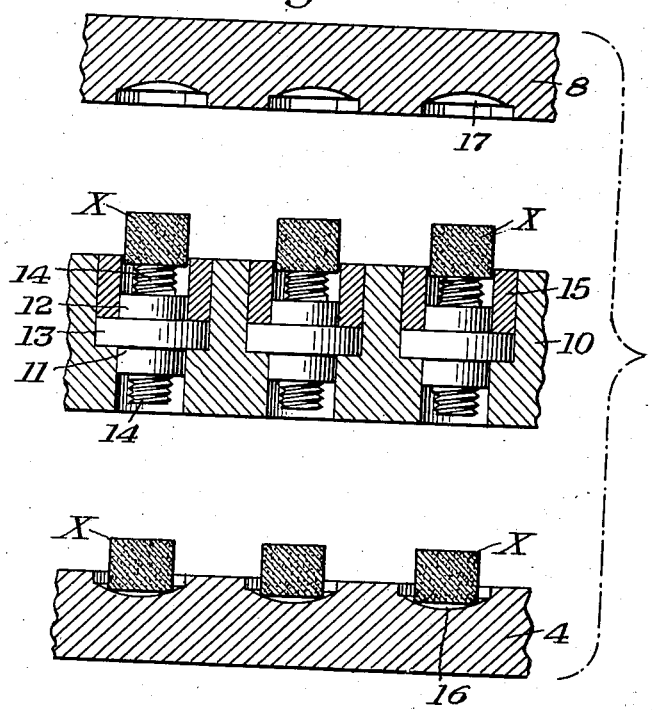
INVENTOR
Walter T. Davis Patented Aug. 26, 1941

2,253,611

UNITED STATES PATENT OFFICE 2,253,611

APPARATUS FOR MOLDING OF PLASTIC ARTICLES

Walter T. Davis, Wheeling, W. Va., assignor to Wheeling Stamping Company, Wheeling, W. Va., a corporation of West Virginia Application May 12, 1937, Serial No. 142,126

4 Claims. (Cl. 18—42)

This invention relates to the molding of articles from plastic materials such, for instance, as articles made of synthetic resins, and particularly to small articles as, for example, caps for toothpaste tubes and bottle caps.

According to the usual practice in molding articles from this material, it is customary to provide a multiple mold formed of two cooperating parts one of which is fixedly mounted in a press and one of which is movably mounted in a press. The multiple mold is charged with individual charges and the press is then operated to close the mold, proper conditions of heat and pressure for curing the resin being maintained. One of these parts of the multiple mold is so mounted in the press that it can be readily removed. This is the part to which the caps or other articles being molded adhere after the molding operation has been finished. This section of the mold is therefore removed after the molding operation and a fresh mold section substituted while the completed articles are being stripped from the section which has just been removed. The molding operation requires a definite period of time and the capacity of the press is limited according to the number of articles which can be made at one time in the multiple mold and the time required for each cycle of operation. The present invention provides an arrangement whereby the productive capacity of the press can be doubled while maintaining the same operating cycle and without greatly increasing the mold cost. According to the present invention the mold is made up with three cooperating sections instead of two, there being a lower mold plate, an intermediate mold plate and an upper mold plate. Cooperating mold cavities are provided in the top of the lower mold plate and the bottom of the intermediate mold plate. Cooperating mold cavities are provided in the top of the intermediate mold plate and the bottom of the top mold plate. By this arrangement, the intermediate mold plate functions to form articles on both its top and bottom surfaces, thereby doubling the capacity of the press.

The invention may be fully understood by reference to the accompanying drawings, in which—

Figure 2 is a fragmentary vertical section through the mold parts with the several mold parts closed showing completely formed articles in the several mold cavities; and Figure 3 is a view similar to Figure 2 showing the mold parts opened up with preformed charges of plastic composition in position in the mold ready for the molding operation.

Figure 1:
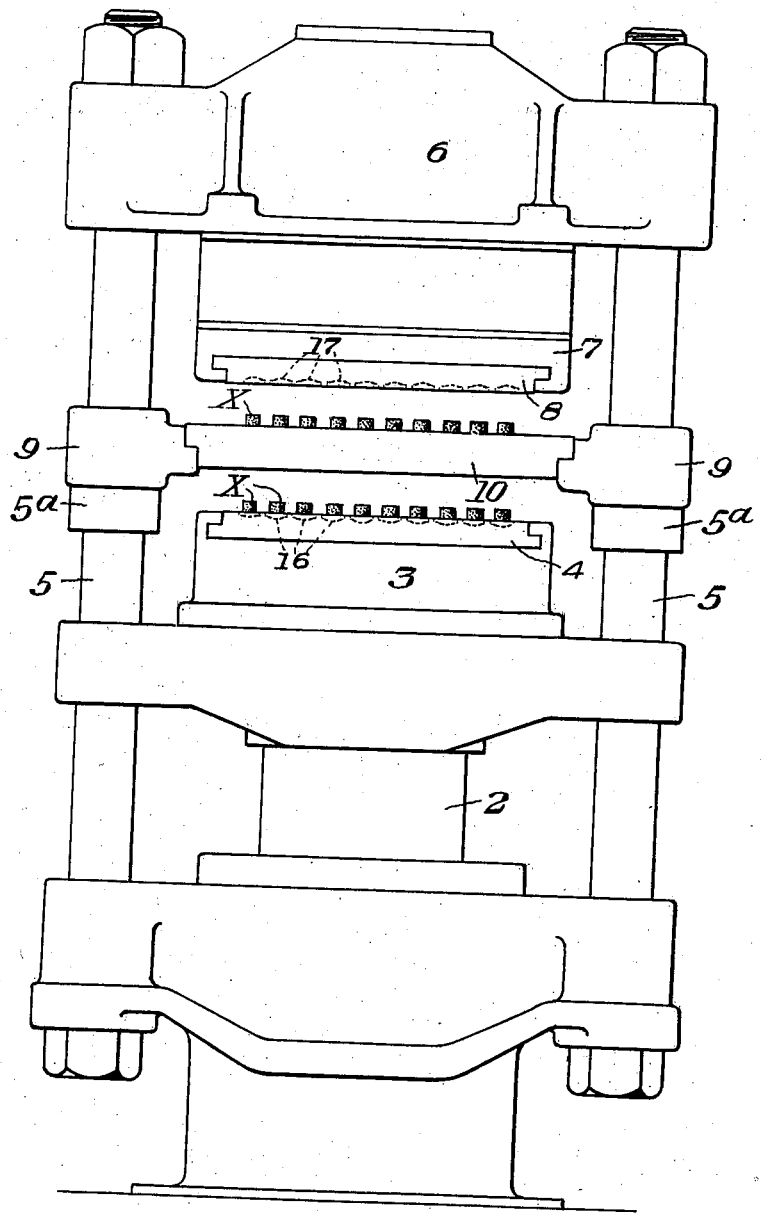
Figure 1 is a general view illustrating a press provided with my invention.

Referring to the drawings which illustrate generally a press of any known or preferred construction, there is a ram 2 on which is carried a lower platen 3, this platen supporting a lower mold plate or section 4. Carried on the base of the press are uprights 5 which support a top frame structure 6 from which is suspended a stationary platen 7. To the under side of the stationary platen 7 there is attached an upper mold plate 8 which is preferably but not necessarily a duplicate of the lower plate 4. Slidable on the posts 5 is a framework 9 in which is removably supported an intermediate mold plate 10. The arrangement is such that when the ram 2 is operated to elevate the platen 3 the lower mold plate 4 will first be brought into engagement with the intermediate mold plate 10. The intermediate mold plate 10 will then be lifted by continued operation of the ram into cooperating relation with the upper mold plate 8. The mold plate 10 is preferably removable from the frame 9 to facilitate the removal of finished articles from the mold in the manner now commonly practiced in the art and as will hereinafter be more fully explained. While I have described for the purpose of illustration one form of the press adapted to utilize my invention, it will be understood that this is merely illustrative and that other types of presses are also applicable to use with the present invention.

The intermediate mold plate 10, as shown in Figures 2 and 3, has a plurality of holes bored therethrough, the number of holes corresponding to the number of mold cavities to be provided in the plate 10. These holes are of larger diameter above the horizontal center of the plate than below and into each hole is fit a flanged pin or forcer 11. Each forcer comprises a cylindrical portion 12 having a flange 13. At the end of the cylindrical portion 12 is an externally threaded extension 14. The flanged pins or forcers are held in the plate 10 by means of bushings 15 which have a tight driving fit in the holes in the plate above the flanges 13. The tops of the bushings are preferably flush with the top of the plate 10 but their exact diameter and shape of the ends thereof may be varied according to the shape of the article being produced. The lower mold plate 4 is provided with a number of complementary cavities 16 adapted to register with the mold cavities formed in the plate 10 and which register with the cavities in the plate 10, the cavities 16 having the desired shape to produce an article of the character desired. In the particular arrangement illustrated, the upper plate 8 has mold cavities 17 in its bottom face, these being duplicates of the cavities 16 formed in the top of the lower plate 4 and being correspondingly positioned. Where it is desired to make caps of a different shape in the upper series of molds than in the lower series of molds, the cavities 16 and 17 may be differently shaped.

In the operation of the mold the press is operated to separate the intermediate plate from the top plate and the press is also operated to separate the bottom plate from the intermediate plate. In the particular form of press illustrated stop collars 5a are provided on the posts 5 to limit the downward movement of the frame 9 and the intermediate mold plate which it carries. Preformed slugs of material are then charged into the cavities 16 of the bottom mold plate as illustrated in Figure 3 where the slugs of material are designated X. The press is then operated in the manner hereinbefore described to bring the parts into the position shown in Figure 2. The customary pressures and temperatures are used and the plastic material is thus molded, each multiple mold unit forming two articles at one time instead of one. After the molding operation has been completed and the press is opened, the intermediate plate 10 may be removed from the press and replaced by a similar plate while the articles which have been formed are stripped from the forcers in the usual manner.

While I have illustrated the mold as being adapted to the manufacture of internally threaded caps of the type commonly employed on toothpaste and similar tubes, it will be understood that this is by way of illustration and the invention is likewise adapted to the forming of other articles, particularly small articles, and that while the drawings illustrate the formation of identical articles on the bottom and top surfaces of the intermediate mold, the mold units may be designed so that different shapes could be formed on one surface of the intermediate mold from those formed on the other.

It will be noted that the arrangement is such that the articles which are formed all adhere to the intermediate mold section so that by removing the intermediate mold section from the press, all of the articles can be stripped by the handling of a single mold plate. Since these mold plates are all of a weight which requires their being handled on a crane, a definite advantage results from the fact that, for instance, 200 caps can be formed with a single handling of a mold plate with the present invention, where only 100 articles are produced in the handling of a mold plate according to the present practice. The invention thus not only increases the capacity of the press but decreases the labor requirement in the production of a given number of caps. It also effects a considerable reduction in mold costs because of the fact that since twice as many caps are made in a single set of molds, fewer sets of molds are required and fewer presses are required to produce a given number of caps in a given length of time. The invention also enables the labor to be more advantageously used for the reason that with the present system the molding cycle may require three minutes of operation, while the operator requires perhaps a minute and a half to strip the completed articles from the molds and prepare the mold for the next forming operation. Since there are twice as many caps formed on a mold plate, more of the operator's time in removing formed articles can be utilized while the pressing cycle is being carried out on another mold plate.

I claim:

1. A molding apparatus comprising an intermediate mold plate having a hole therethrough, a flanged forcer in the hole having forming means at each end thereof of less diameter than the hole, said forcer being shorter than the thickness of the intermediate plate whereby the said forming means terminate within the holes, and cooperating top and bottom mold plates having cavities which are complementary to cavities formed by the hole in the intermediate plate, said plates being vertically movable relatively to one another.

2. Apparatus for molding comprising a mold plate having an opening therethrough adapted to provide a mold cavity, means carried by the plate in the opening of less thickness than the plate separating the opening into separate mold cavities, one in one face of the plate and one in the opposite face of the plate, said means comprising a pin member fitted into the opening and having a flange intermediate its ends, means being provided in the plate forming a seat for the flange to restrain the pin against movement.

3. Apparatus for molding comprising an intermediate mold plate having a plurality of openings therethrough, said openings being provided with an internal shoulder, a forcer in each opening having a flanged portion which seats on said shoulder, and means in each opening for retaining the forcer in the opening, said means being shaped to provide a portion of a mold cavity, the forcer being constructed with pin portions at each end thereof spaced inwardly from the walls of the hole to provide separate mold cavities in both faces of the plate about such pin portions.

4. Apparatus for molding comprising a mold plate having a plurality of openings therethrough, the openings having a shouldered offset therein whereby the openings have a greater diameter at one face of the plate than the other, a double ended forcer in each hole having an intermediate flange portion to engage the shouldered offset, and a bushing projecting over the flange of the forcer removably secured to the walls of the portion of the hole of greater diameter to hold the forcer in place, the bushings being spaced from the forcer to provide a mold cavity, the hole in the mold plate providing a cavity about each end of the forcer.

WALTER T. DAVIS.